United States Patent [19]
Corato et al.

[11] Patent Number: 4,730,339
[45] Date of Patent: Mar. 8, 1988

[54] METHOD OF CALCINING CARBONACEOUS BODIES, IN PARTICULAR ELECTRODES, IN EITHER CONTINUOUS OR INTERMITTENT FURNACES, AND A CONTAINMENT STRUCTURE FOR THE IMPLEMENTATION THEREOF

[75] Inventors: Renzo Corato, Mestre; Giulio Ganapini, Genoa; Hans-Anton Meier, Milan; Mauro Poggi, Genoa; Antonio Rosso, Venice; Sergio Sanchioni, Mestre, all of Italy

[73] Assignees: Alusuisse Italia S.p.A., Milan; Italimpianti Società Italiana Impianti p.A., Genoa; Sirma S.p.A., Malcontenta, all of Italy

[21] Appl. No.: 778,645

[22] Filed: Sep. 23, 1985

[30] Foreign Application Priority Data

Sep. 28, 1984 [IT] Italy ................................. 22918 A/84

[51] Int. Cl.$^4$ ............................................. H05B 3/60
[52] U.S. Cl. ..................................... 373/120; 432/121; 201/19
[58] Field of Search ............... 373/109, 120, 122, 130, 373/137; 201/17, 18, 19; 264/29.5; 432/121, 153

[56] References Cited
U.S. PATENT DOCUMENTS

| | | | |
|---|---|---|---|
| 800,515 | 9/1905 | Tone | 373/120 |
| 2,247,185 | 6/1941 | Caccioppoli | 201/32 |

*Primary Examiner*—Roy N. Envall, Jr.
*Attorney, Agent, or Firm*—Guido Modiano; Albert Josif

[57] ABSTRACT

A method of calcining carbonaceous bodies, in particular electrodes such as those employed in the production of aluminum or steel, in either continuous or intermittent furnaces with the use of containment structures whereinto carbonaceous bodies to be calcined are placed and then covered at least laterally with a carbonaceous powder, is characterized in that the structure walls are caused to collapse from the sides outwards on the occurrence of the expansion whereto the carbonaceous bodies are subjected during calcination.

The containment structure which affords implementation of the method comprises a base frame, refractory supports placed on said frame and carrying refractory plates forming the loading platform, and a sideway complying edge formation on expansion of the carbonaceous bodies.

15 Claims, 5 Drawing Figures

METHOD OF CALCINING CARBONACEOUS BODIES, IN PARTICULAR ELECTRODES, IN EITHER CONTINUOUS OR INTERMITTENT FURNACES, AND A CONTAINMENT STRUCTURE FOR THE IMPLEMENTATION THEREOF

BACKGROUND OF THE INVENTION

This invention concerns a method of calcining carbonaceous bodies, in particular electrodes, in either continuous or intermittent furnaces, and a containment structure for the implementation thereof.

Known are methods of calcining anodes in continuous furnaces. One of such prior methods (cfr. Published German Application DE-OS No. 3042708) provides for the carbonaceous blocks (anodes) to be covered with carbonaceous powder in order to protect them against oxidation, stowed into muffles, placed onto a truck, and pushed into the furnace in accordance with a preset thermal scheme.

During heating, and in particular in the temperature range of 300° to 500° C., there takes place a gaseous emission from the anodes of volatile organics issuing from the decomposition and/or distillation of a fraction of the binder forming the anode, in the gaseous, vapor, and particulate forms. Since the volatile substances comprise essentially aromatic hydrocarbons, said prior method has the drawback of being highly polluting.

To obviate such a drawback, a method has been proposed (cfr. European Patent Specification EP-OS No. 103130) wherein provisions are made for covering the carbonaceous bodies with an antioxidant protective powder and calcining them as moving through a truck furnace, in an oxidizing medium, which at the operating temperature, enables complete burning of the volatile substances within the furnace, and accordingly, the release of volatile-free gases.

However, since the carbonaceous bodies undergo in calcining an expansion due to the temperature increase, that prior method poses the problem that the electrodes distort, crack, and often open up on account of their contacting the truck walls, the rigid structure whereof opposes the expansion thrust.

Furthermore, owing to the chemical and physical changes undergone by the binder, pitch in this case, during calcination there form in the carbonaceous bodies cracks which deteriorate their mechanical and electrical properties.

SUMMARY OF THE INVENTION

According to this invention, all such problems are obviated by a method of calcining carbonaceous bodies, in particular electrodes, in either continuous or intermittent furnaces by the use of containment structures whereinto carbonaceous bodies to be calcined are placed and then covered at least laterally with means of protection, control of oxidation, and transmitting expansion, characterized in that at least two sidewalls of the structure are caused to collapse sideway outwards following the expansion undergone by the carbonaceous bodies during calcination.

To implement the method, this invention envisages the use of a containment structure characterized in that it comprises a base frame, refractory supports placed on said frame and carrying refractory plates adapted to form the loading surface or platform, and a sideway complying edge formation as a result of the expansion undergone by the carbonaceous bodies.

BRIEF DESCRIPTION OF THE DRAWINGS

The invention is further explained hereinafter in connection with a preferred embodiment and some modifications thereof, given herein by way of example and not of limitation with reference to the accompanying drawings, where.

DESCRIPTION OF THE PREFERRED EMBODIMENTS

Figure 1:
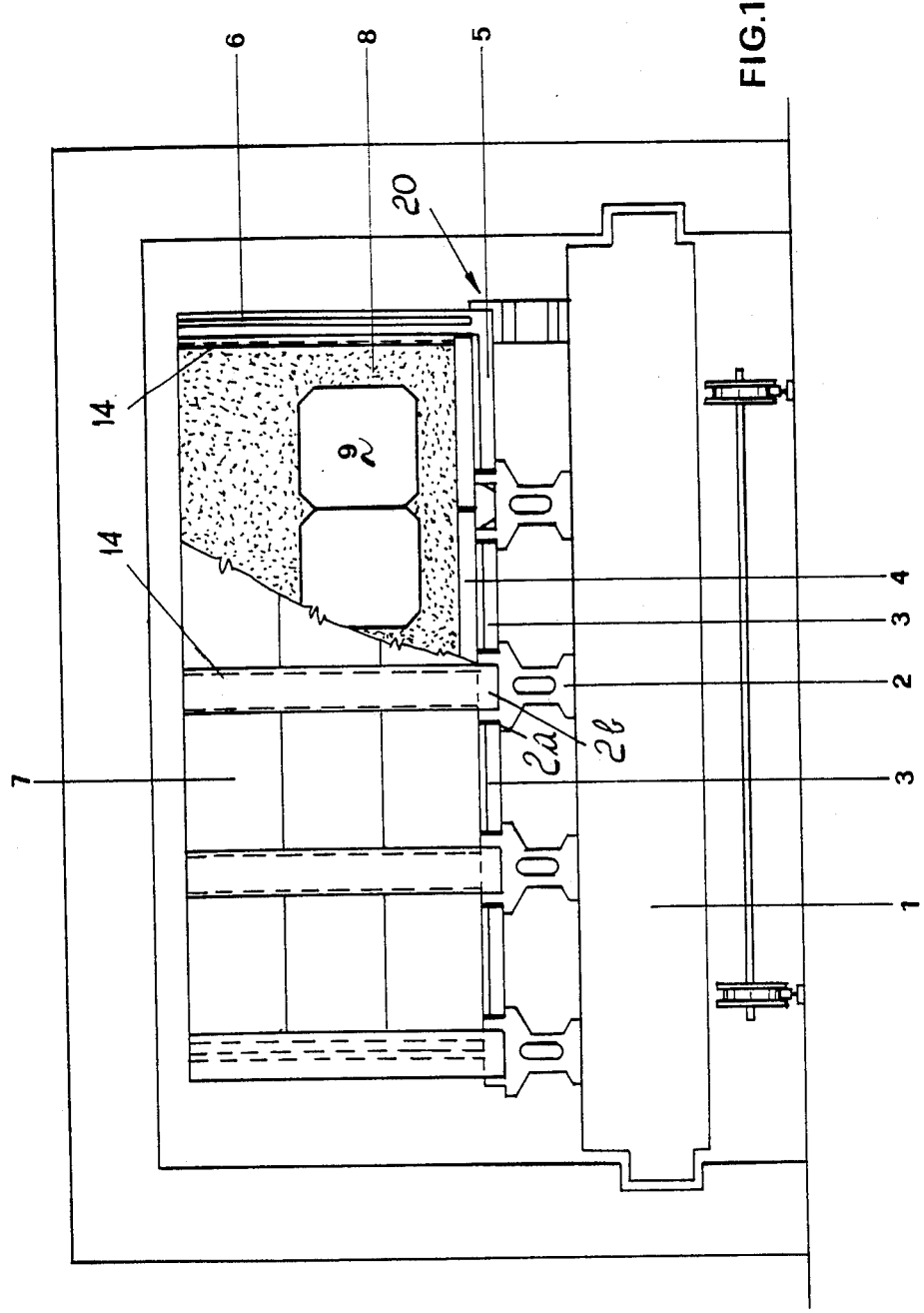
FIG. 1 is a partly sectional front view of a containment structure for firing electrodes, which implements the inventive method.

As is apparent from the drawing figures, the method of this invention envisages that carbonaceous bodies, in particular electrodes, be calcined in a continuous furnace comprised, in this instance, by a truck furnace on which the electrodes are placed, preferably in a single layer, although several layers may be viable in some cases.

Each of the trucks comprises a metal frame 1 on which modular hollow base supports 2 are made to rest which are formed from a refractory material.

Such base supports 2 are essentially in the form of columns and laterally provided with stepped grooves 2a adapted to receive beams 3 thereon which form in combination a rest grid for loading or bottom plates 4. Elements 5 rest on the peripheral base supports 2 from a central seat 2b of which extend vertical or upstanding pillars 6 provided with longitudinal flutes 14 confronting corresponding flutes on the adjacent pillars. In essence, the elements 5 resting on the peripheral base supports 2 form, in combination with the corresponding vertical pillars, L-like elements which carry in pairs plates 7 forming in combination the containment sidewalls of the truck. The plates 7 are inserted with the vertical sides between confronting flutes 14 of the pillars 6 and are superimposed to reach a greater combined height than the carbonaceous bodies to be calcined.

In particular, the height of the horizontal section of the L-like elements is smaller than the height of the base support step, thereby said elements are allowed to move outwards.

The pillars 6 and plates 7 constitute an edge formation or border 20 of the side wall 12, which is yieldable in an outward, lateral direction.

In operation, a layer of incoherent material such as carbonaceous powder 8 is first laid on the loading surface of a truck, which layer forms the means of protection, control of oxidation, and transmission of expansion in accordance with the invention, and the electrodes 9 to be calcined are then placed onto said layer.

Thereafter, a filler, again comprised of carbonaceous powder, is poured over said electrodes which completely covers them all around and surrounds them laterally. The truck is then moved to the furnace interior to subject the electrodes 9 to the calcining process.

During calcination, the sidewalls 6 of the truck are allowed to move in a sideway direction with respect to the bottom plates, thus absorbing the thrust from the expanding electrodes as the temperature rises.

On leaving the furnace, upon removal of the calcined carbonaceous bodies the original shape of the containment structure of the truck is restored by closing back the sidewalls, and this operation may be carried out in an automated fashion.

Figure 2:
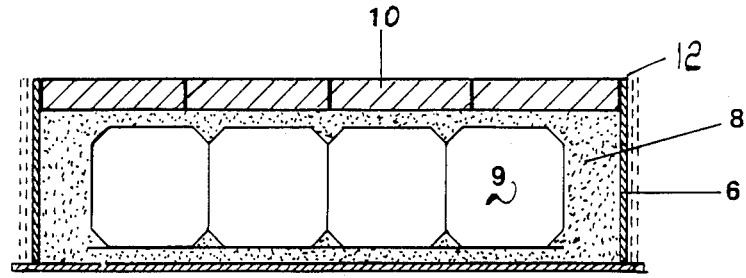
FIG. 2 shows schematically in a fragmentary front sectional view, a structure with the electrodes subjected to the action of weights.

In a modified embodiment, the inventive method contemplates that a plurality of evenly distributed weights 10 (see FIG. 2) be placed on the filler 8 which comprise, of preference, corrosion-resistant plates of a refractory material. This arrangement affords the advantage that, by virtue of the provision of the weights 10 over the electrodes 9, the thrust from the internal stresses of the latter during the binder softening phase can be counteracted to prevent their deformation and possible cracking.

Figure 3:
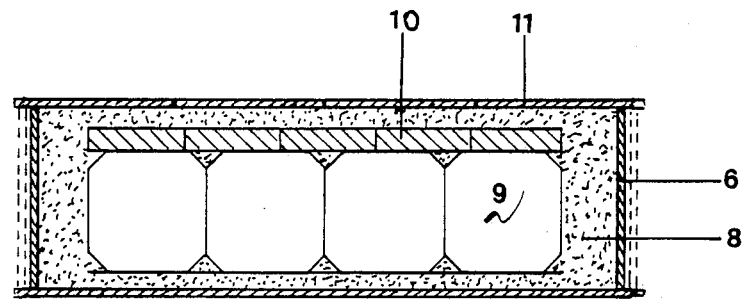
FIG. 3 is a view similar to FIG. 2, showing a modified embodiment of the structure.

In another embodiment of the invention (see FIG. 3), the weights 10 are placed in direct contact with the top surface of the electrodes 9, and are then covered with carbonaceous powder. On the layer formed by said powder, there are placed additional light-weight plates 11 having the function of protecting the powder filler against oxidation.

In these embodiments, the sidewalls of the border 20 are allowed to translate outwardly upon the electrodes expanding.

Figure 4:
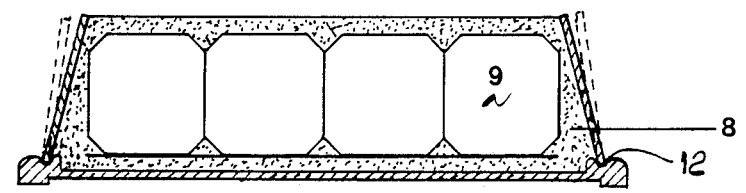
FIGS. 4 and 5 are views similar to FIG. 2, showing two further embodiments of the structure.

In a modified embodiment (see FIG. 4), the sidewalls 12 of the border or edge formation 20 are hinged with their bottom edge to the truck structure and set sloping inwardly or in any case held close against the filler 8. Thus, upon the electrodes beginning to expand, the walls can yield sideways and tilt part-way out, thereby the thrusts brought about by such expansion movements can be absorbed also in this case.

Figure 5:
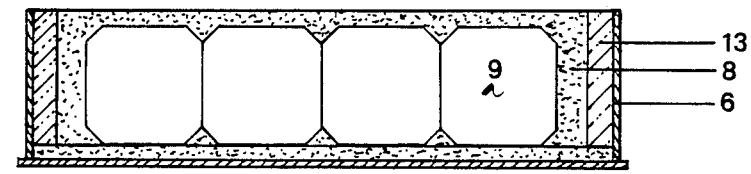

In a further embodiment (see FIG. 5), between the outer walls of the border 20 and the carbonaceous powder there is interposed a layer of a yieldable material 13 (e.g. glass wool or some other fibrous material, or polymeric foam, etc.) having the function of absorbing the expansion of the electrodes during calcination. The material 13 may either be a plastically or elastically yielding material, or a heat-destructible one which is destroyed at the processing temperature. Depending on the chemical and physical properties of the yieldable or heat-destructible material employed, the latter may be used in one or more passages through the furnace interior, i.e. in a first passage the material may be only partially affected.

While the invention has been described and illustrated with reference to a preferred embodiment and some variations thereof, it may be appreciated that other modifications may be introduced in practicing it without deviating from the protection scope of this patent of industrial invention.

What is claimed is:

1. In a method for calcining carbonaceous bodies into calcined carbonaceous bodies, comprising providing a containment structure having enclosure walls including outwardly sideways yieldable side walls means defining an original shape of said containment structure, placing the carbonaceous bodies into said containment structure, covering said carbonaceous bodies within said containment structure all around with incoherent materials defining protective layers for the carbonaceous bodies within said containment structure, introducing said so filled containment structure into a calcining furnace, calcining therein said carbonaceous bodies and allowing at the same time said carbonaceous bodies to expand under the action of the processing temperature, withdrawing the containment structure from the furnace, removing the calcined carbonaceous bodies therefrom and preparing said containment structure for a subsequent operative cycle, the step of causing said side wall means to yield outwardly sideways during the calcining stage under the expansion action of said carbonaceous bodies at the processing temperature and the step of restoring said original shape of said containment structure by moving back the yielded side wall means during the stage of preparation of said containment structure for said subsequent operative cycle.

2. A method according to claim 1, wherein the step of covering said carbonaceous bodies within said containment structure all around with incoherent materials comprises so covering said carbonaceous bodies with carbonaceous powder.

3. A method according to claim 1, wherein the step of covering said carbonaceous bodies within said containment structure all around with incoherent materials comprises incorporating in said side wall means at least one layer of yieldable material and wherein the step of causing said side walls to yield outwardly consists of causing said layer of yieldable material to yield under the expansion action of said carbonaceous bodies.

4. A method according to claim 3, wherein said layer of yieldable material is a fibrous material.

5. A method of claim 4, wherein said fibrous material is glass wool.

6. A method of claim 3, wherein said layer of yieldable material is polymeric foam.

7. A method of claim 1, wherein the step of covering said carbonaceous bodies within said containment structure all around with incoherent materials comprises incorporating in said side wall means at least one layer of heat-destructible material and wherein the step of causing said side walls to yield outwardly consists of destroying at least partially said layer of heat-destructible material under the action of processing temperature.

8. A containment truck structure for containing therein carbonaceous bodies and for introducing the containment structure with the carbonaceous bodies therein into a furnace for the calcination of the carbonaceous bodies, the containment truck structure comprising, a filler material for covering said carbonaceous bodies, wall means defining an enclosure space for enclosing therein said carbonaceous bodies and said filler material and including bottom plate means and side wall means extending upwardly from said bottom plate means, said side wall means being arranged in outwardly yieldable relationship with respect to said bottom plate means to allow said enclosure space to increase with the thermal expansion of said carbonaceous bodies.

9. A containment truck structure for containing therein carbonaceous bodies in the form of electrodes and for introducing the containment structure with the carbonaceous bodies therein into a furnace for the calcination of the carbonaceous bodies, the containment truck structure comprising, a filler material for covering said electrodes, wall means defining an enclosure space for said electrodes and said filler material and including bottom plate means and opposite side wall means extending from said bottom plate means upwardly convergent to each other, said opposite side wall means being pivotally supported on said bottom plate means in outwardly tiltable relationship with respect to said bottom plate means to allow said enclosure space to increase with the thermal expansion of said carbonaceous bodies.

10. A containment structure for containing therein carbonaceous bodies and for introducing the containment structure with the carbonaceous bodies therein into a furnace for the calcination of the carbonaceous bodies, the containment structure comprising, base supports horizontally spaced at regular distances from each other, a rest grid defining horizontal bottom beams with opposite end portions, said base supports having central seat formations and lateral stepped groove formations for receiving therein said opposite end portions of said beams, horizontal loading plates supported on said grid, pillars supported in said central seats and extending upwards therefrom, said pillars having longitudinal flutes, the flutes of opposite pillars facing each other, wall defining plates having edge portions seated in said flutes, said wall defining plates including side wall defining plates, said pillars including side wall plates supporting pillars arranged in outwardly yieldable relationship with respect to said bottom plate means.

11. A containment truck structure for containing therein carbonaceous bodies in the form of electrodes and for introducing the containment structure with the carbonaceous bodies therein into a furnace for the calcination of the carbonaceous bodies, the containment truck structure comprising, a filler material for covering said electrodes, wall means defining an enclosure space for said electrodes and said filler material and including bottom plate means and side wall means extending upwardly from said bottom plate means, said side wall means having internally at least one layer of yieldable material to allow said enclosure space to increase with the thermal expansion of said electrodes.

12. A containment structure according to claim 11, wherein said yieldable material is yieldable fibrous material.

13. A containment structure according to claim 11, wherein said yieldable material is glass wool.

14. A containment structure according to claim 11, wherein said yieldable material is polymeric foam.

15. A containment truck structure for containing therein carbonaceous bodies in the form of electrodes and for introducing the containment structure with the carbonaceous bodies therein into a furnace for the calcination of the carbonaceous bodies, the containment truck structure comprising, a filler material for covering said electrodes, wall means defining an enclosure space for said electrodes and said filler material and including bottom plate means and side wall means extending upwardly from said bottom plate means, said side wall means having internally at least one layer of heat-destructible material to allow said enclosure space to increase with the heat destruction of said material to permit thermal expansion of said carbonaceous bodies.

* * * * *